(12) United States Patent
Rademacher et al.

(10) Patent No.: US 10,400,056 B2
(45) Date of Patent: *Sep. 3, 2019

(54) BLOCK COPOLYMERS INCLUDING HIGH VINYL SEGMENTS

(71) Applicant: BRIDGESTONE CORPORATION, Tokyo (JP)

(72) Inventors: Christine M. Rademacher, Akron, OH (US); Daniel F. Graves, Canal Fulton, OH (US)

(73) Assignee: Firestone Polymers, LLC, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/008,781

(22) Filed: Jun. 14, 2018

(65) Prior Publication Data

US 2018/0291135 A1 Oct. 11, 2018

Related U.S. Application Data

(63) Continuation of application No. 15/665,849, filed on Aug. 1, 2017, now Pat. No. 10,005,874, which is a continuation of application No. 14/330,468, filed on Jul. 14, 2014, now Pat. No. 9,732,178, which is a continuation of application No. 12/508,296, filed on Jul. 23, 2009.

(60) Provisional application No. 61/083,305, filed on Jul. 24, 2008.

(51) Int. Cl.
*C08F 297/04* (2006.01)
*C08F 297/00* (2006.01)
*C08F 293/00* (2006.01)

(52) U.S. Cl.
CPC .......... *C08F 297/04* (2013.01); *C08F 293/00* (2013.01); *C08F 297/00* (2013.01)

(58) Field of Classification Search
CPC ..... C08F 297/00; C08F 297/04; C08F 293/00
See application file for complete search history.

(56) References Cited

U.S. PATENT DOCUMENTS

| | | | |
|---|---|---|---|
| 3,426,006 A | 2/1969 | Holzrichter et al. | |
| 3,652,516 A | 3/1972 | Farrer | |
| 4,098,980 A | 7/1978 | Markle et al. | |
| 4,367,325 A | 1/1983 | Takeuchi et al. | |
| 4,397,994 A | 8/1983 | Takeuchi et al. | |
| 4,429,091 A | 1/1984 | Hall | |
| 4,616,065 A | 10/1986 | Hargis et al. | |
| 4,647,635 A | 3/1987 | Hall | |
| 5,109,069 A | 4/1992 | Shibata et al. | |
| 5,231,152 A | 7/1993 | Roggeman et al. | |
| 5,241,008 A | 8/1993 | Hall | |
| 5,268,439 A | 12/1993 | Hergenrother et al. | |
| 5,272,207 A | 12/1993 | Hall et al. | |
| 5,329,005 A | 7/1994 | Lawson et al. | |
| 5,331,035 A | 7/1994 | Hall | |
| 5,332,810 A | 7/1994 | Lawson et al. | |
| 5,393,721 A | 2/1995 | Kitamura et al. | |
| 5,432,232 A | 7/1995 | Hattori et al. | |
| 5,463,003 A | 10/1995 | Horikawa et al. | |
| 5,463,004 A | 10/1995 | Horikawa | |
| 5,489,660 A | 2/1996 | Roggeman et al. | |
| 5,491,230 A | 2/1996 | Lawson et al. | |
| 5,521,309 A | 5/1996 | Antkowiak et al. | |
| 5,548,045 A | 8/1996 | Goto et al. | |
| 5,550,200 A | 8/1996 | Shibata et al. | |
| 5,561,197 A | 10/1996 | Rempel et al. | |
| 5,574,109 A | 11/1996 | Lawson et al. | |
| 5,578,542 A | 11/1996 | Lawson et al. | |
| 5,587,420 A | 12/1996 | Takizawa et al. | |
| 5,698,646 A | 12/1997 | Kitamura et al. | |
| 5,726,237 A | 3/1998 | Satoh et al. | |
| 5,777,043 A | 7/1998 | Shafer et al. | |
| 5,786,441 A | 7/1998 | Lawson et al. | |
| 6,084,025 A | 7/2000 | Kitamura et al. | |
| 6,147,178 A | 11/2000 | Nakamura et al. | |
| 6,162,874 A | 12/2000 | Wollum et al. | |
| 6,221,963 B1 | 4/2001 | Geprags et al. | |
| 6,271,313 B1 | 8/2001 | Zarribelli et al. | |
| 6,274,666 B1 | 8/2001 | Dougherty | |
| 6,303,721 B1 | 10/2001 | Latsch et al. | |
| 6,306,976 B1 | 10/2001 | Matsuda et al. | |
| 6,329,459 B1 | 12/2001 | Kang et al. | |
| 6,372,853 B1 | 4/2002 | Li et al. | |
| 6,372,863 B1 | 4/2002 | Kerns et al. | |
| 6,455,655 B1 | 9/2002 | Colvin et al. | |
| 6,496,940 B1 | 12/2002 | Horst et al. | |
| 6,521,720 B2 | 2/2003 | Knauf et al. | |
| 6,608,154 B2 | 8/2003 | Halasa et al. | |
| 6,649,724 B2 | 11/2003 | Nakamura et al. | |
| 6,759,497 B2 | 7/2004 | Grun et al. | |
| 6,784,253 B2 | 8/2004 | Vilasagar et al. | |
| 6,835,761 B2 | 12/2004 | Kondou et al. | |

(Continued)

FOREIGN PATENT DOCUMENTS

JP 6116342 A 4/1994
WO 2007058736 A1 5/2007

(Continued)

OTHER PUBLICATIONS

Bhowmik, A K et al. Handbook of Elastomers 2nd Edition; CRC Press; Nov. 2, 2000; pp. 818-821.

(Continued)

*Primary Examiner* — Irina S Zemel
*Assistant Examiner* — Jeffrey S Lenihan
(74) *Attorney, Agent, or Firm* — Meredith E. Hooker; Arthur M. Reginelli

(57) ABSTRACT

A method for the preparation of block copolymers including at least one high vinyl segment, the method comprising (i) charging into a reactor a diene monomer in a hydrocarbon solvent, a catalytically effective amount of anionic initiator, and an oligomeric oxolanyl propane, whereby the reactor is optionally cooled; (ii) allowing the diene monomer to polymerize at a peak polymerization temperature of at least about 18° C. and less than about 60° C. to form a first block where the vinyl content is at least about 50 percent by weight; (iii) after step (ii), charging into the reactor a vinyl aromatic monomer, whereby the reactor is optionally heated to a temperature up to about 60° C.; (iv) allowing the vinyl aromatic monomer to polymerize to form a second block; and (v) optionally charging into the reactor a quenching agent.

14 Claims, No Drawings

(56) References Cited

U.S. PATENT DOCUMENTS

| | | |
|---|---|---|
| 6,875,818 B2 | 4/2005 | Wang |
| 6,897,279 B2 | 5/2005 | Nakamura et al. |
| 7,060,762 B2 | 6/2006 | Schaedler et al. |
| 7,153,919 B2 | 12/2006 | Hogan et al. |
| 7,169,850 B2 | 1/2007 | Handlin, Jr. et al. |
| 7,282,536 B2 | 10/2007 | Handlin, Jr. et al. |
| 7,335,712 B2 | 2/2008 | Yan et al. |
| 7,348,376 B2 | 3/2008 | Gelles |
| 7,439,301 B2 | 10/2008 | Handlin, Jr. et al. |
| 7,469,848 B2 | 12/2008 | Yamanaka et al. |
| 7,560,509 B2 | 7/2009 | Hall |
| 9,732,178 B1 * | 8/2017 | Rademacher ......... C08F 293/00 |
| 2003/0125477 A1 | 7/2003 | Rademacher et al. |
| 2003/0187137 A1 | 10/2003 | Handlin et al. |
| 2004/0220344 A1 | 11/2004 | DeDecker et al. |
| 2004/0249085 A1 | 12/2004 | Waddell et al. |
| 2005/0222331 A1 | 10/2005 | Hoshi et al. |
| 2006/0089447 A1 | 4/2006 | Robertson et al. |
| 2006/0264589 A1 | 11/2006 | Yan |
| 2006/0264590 A1 | 11/2006 | Hogan et al. |
| 2007/0142593 A1 | 6/2007 | Pawlow et al. |
| 2007/0196653 A1 | 8/2007 | Hall et al. |
| 2008/0033110 A1 | 2/2008 | Suzuki et al. |
| 2008/0070053 A1 | 3/2008 | Schmierer et al. |
| 2008/0164445 A1 | 7/2008 | Lin et al. |
| 2008/0287559 A1 | 11/2008 | King et al. |
| 2009/0118430 A1 | 5/2009 | Sosa |
| 2010/0004402 A1 | 1/2010 | King et al. |
| 2017/0342187 A1 | 11/2017 | Rademacher et al. |

FOREIGN PATENT DOCUMENTS

| | | |
|---|---|---|
| WO | 2008021418 A1 | 2/2008 |
| WO | WO 2008/021417 A2 | 2/2008 |
| WO | 2009108453 A1 | 9/2009 |

OTHER PUBLICATIONS

U.S. Appl. No. 15/666,238 to Rademacher, et al. filed Aug. 1, 2017.

* cited by examiner

BLOCK COPOLYMERS INCLUDING HIGH VINYL SEGMENTS

This application is a continuation application of U.S. Non-Provisional application Ser. No. 15/665,849 filed on Aug. 1, 2017, U.S. Non-Provisional application Ser. No. 14/330,468 filed on Jul. 14, 2014 and issued as U.S. Pat. No. 9,732,178, U.S. Non-Provisional application Ser. No. 12/508,296, filed on Jul. 23, 2009, each of which claims the benefit of U.S. Provisional Application Ser. No. 61/083,305 filed on Jul. 24, 2008, and are incorporated herein by reference.

FIELD OF THE INVENTION

One or more embodiments of the present invention are directed toward methods of preparing block copolymers that include at least one polyvinyl aromatic segment and at least one polydiene segment, where the polydiene segment is characterized by a relatively high vinyl content.

SUMMARY OF THE INVENTION

One or more embodiments of the present invention provide a method for the preparation of block copolymers including at least one high vinyl segment, the method comprising (i) charging into a reactor a diene monomer in a hydrocarbon solvent, a catalytically effective amount of anionic initiator, and an oligomeric oxolanyl propane, whereby the reactor is optionally cooled; (ii) allowing the diene monomer to polymerize at a peak polymerization temperature of at least about 18° C. and less than about 60° C. to form a first block where the vinyl content is at least about 50 percent by weight; (iii) after step (ii), charging into the reactor a vinyl aromatic monomer, whereby the reactor is optionally heated to a temperature up to about 60° C.; (iv) allowing the vinyl aromatic monomer to polymerize to form a second block; and (v) optionally charging into the reactor a quenching agent.

One or more embodiments of the present invention provide a method for the preparation of block copolymers including at least one high vinyl segment, the method comprising (i) charging into a reactor a diene monomer in a hydrocarbon solvent, a catalytically effective amount of anionic initiator, and an oligomeric oxolanyl propane, whereby the reactor is optionally cooled; (ii) allowing the diene monomer to polymerize at a peak polymerization temperature of at least about 18° C. and less than about 60° C. to form a first block where the vinyl content is at least about 50 percent by weight; (iii) after step (ii), charging into the reactor a vinyl aromatic monomer; (iv) allowing the vinyl aromatic monomer to polymerize to form a second block; (v) after step (iv), charging into the reactor diene monomer; (vi) allowing the monomer to polymerize at a peak polymerization temperature up of at least about 18° C. and less than about 60° C. to form a third block where the vinyl content is at least about 50 percent by weight; (vii) optionally further charging into the reactor the vinyl aromatic monomer and allowing the vinyl aromatic monomer to polymerize to form a fourth block; and (viii) optionally charging into the reactor a quenching agent.

One or more embodiments of the present invention provide a block copolymer defined by the formula I: $\alpha$-V-D-$\omega$, where V is a polyvinyl aromatic block, D is a polydiene block, $\alpha$ and $\omega$ are each independently a hydrogen atom, a functional group, or a polymeric segment or block, and where D is characterized by a vinyl content of at least 50%.

Other embodiments provide a block copolymer defined by the formula II: d-V-D-$\omega$, where d is a polydiene block deriving from the polymerization of diene monomer, V, D, and $\omega$ are as defined above with respect to formula I, and where D and d are characterized by a vinyl content of at least 50%.

Other embodiments provide a block copolymer defined by the formula III: $\alpha$-$V^O$-D-V'-$\omega$, where each V is independently a polyvinyl aromatic block, D is a polydiene block, $\alpha$ and $\omega$ are each independently a hydrogen atom, a functional group, or a polymeric segment or block, and where D is characterized by a vinyl content of at least 50%.

Other embodiments provide a block copolymer defined by the formula IV: d-$V^O$-D-V'-$\omega$, where d is a polydiene block, and $V^O$, V', D, and $\omega$ are as defined above with respect to Formula III, and where D and d are characterized by a vinyl content of at least 50%.

Other embodiments provide a method for preparing a block copolymer of the type including at least one diene block and at least one vinyl aromatic block, where the block copolymer is prepared in solvent using anionic polymerization techniques, wherein the improvement comprises synthesizing the at least one diene block in the presence of at least about 0.025 pbw oligomeric oxolanyl propane per 100 pbw monomer and maintaining the peak polymerization temperature at a temperature of at least about 18° C. and less than about 60° C.

DETAILED DESCRIPTION OF ILLUSTRATIVE EMBODIMENTS

One or more embodiments of the present invention relate to block copolymers including at least one polyvinyl aromatic block and at least one polydiene block. The polydiene block is characterized by a relatively high vinyl content. In one or more embodiments, where the copolymer includes multiple diene blocks, the overall copolymer is characterized by an advantageously high vinyl content.

One or more embodiments of the present invention provide block copolymers that may be defined by the formula I:

where V is a polyvinyl aromatic block, D is a polydiene block, $\alpha$ and $\omega$ are each independently a hydrogen atom, a functional group, or a polymeric segment or block, and where D is characterized by a vinyl content of at least 50%.

In one or more embodiments, polyvinyl aromatic blocks include three or more mer units deriving from the polymerization of vinyl aromatic monomer. Exemplary vinyl aromatic monomer include, without limitation, styrene, $\alpha$-methyl styrene, p-methylstyrene, and vinylnaphthalene. In one or more embodiments, polydiene blocks include three or more mer units deriving from the polymerization of conjugated diene monomer. Exemplary conjugated diene monomer include, without limitation, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. In one or more embodiments, functional groups include organic or inorganic moieties that include at least one heteroatom. In one or more embodiments, polymeric segments include homopolymers or copolymers.

In one or more embodiments, D of formula I is characterized by a vinyl content (i.e. the percentage of mer units positioned in the 1,2-microstructure) of at least 50%, in other embodiments at least 55%, in other embodiments at least 60%, in other embodiments at least 65%, in other embodiments at least 70%, in other embodiments at least 75%, in other embodiments at least 80%, and in other embodiments at least 85%. In these or other embodiments, D of formula I is characterized by a vinyl content of less than 100%, in other embodiments less than 95%, in other embodiments less than 90%, in other embodiments less than 85%, and in other embodiments less than 80%. The vinyl content may be determined by proton NMR, and as reported herein refers to the percentage of mer units positioned in the 1,2-microstructure based on the total mer units deriving from the polymerization of conjugated diene monomer.

In one or more embodiments, the D block of formula I includes at least 250, in other embodiments at least 350, in other embodiments at least 450, and in other embodiments at least 550 mer units deriving from the polymerization of conjugated diene monomer. In these or other embodiments, the D block of formula I includes less than 800, in other embodiments less than 750, in other embodiments less than 700, in other embodiments less than 650, and in other embodiments less than 600 mer units deriving from the polymerization of conjugated diene monomer.

In one or more embodiments, the V block copolymer of formula I includes at least 50, in other embodiments at least 120, in other embodiments at least 145, in other embodiments at least 160, in other embodiments at least 180, in other embodiments at least 200, and in other embodiments at least 225 mer units deriving from the polymerization of vinyl aromatic monomer. In these or other embodiments, the V block of formula I includes less than 400, in other embodiments less than 350, in other embodiments less than 325, in other embodiments less than 300, and in other embodiments less than 280 mer units deriving from the polymerization of vinyl aromatic monomer.

In one or more embodiments, the block copolymers defined by the formula I are characterized by low levels of tapering, which may also be referred to as randomness between the blocks of the polymer chain. In other words, and for example, a vinyl aromatic block (e.g. polystyrene block) of the block copolymer will have a limited number, if any, of mer units deriving from conjugated diene (e.g. 1,3-butadiene) within the block. For purposes of this specification, tapering will refer to the level or amount of mer units (in moles) present within a given block as an impurity in that block (e.g. styrene mer units within a polybutadiene block). In one or more embodiments, the blocks of the block copolymers defined by the formula I include less than 5%, in other embodiments less than 3%, in other embodiments less than 1%, and in other embodiments less than 0.5% tapering in any given block of the block copolymer. In these or other embodiments, the blocks of the block copolymers defined by the formula I are substantially devoid of tapering, which includes that amount of tapering or less that will not have an appreciable impact on the block copolymer. In one or more embodiments, the blocks of the block copolymers defined by the formula I are devoid of tapering.

In one or more embodiments, α is a diene block deriving from the polymerization of diene monomer, and therefore the block copolymer can be defined by the formula II $$d\text{-}V\text{-}D\text{-}\omega$$

where d is a polydiene block deriving from the polymerization of diene monomer, V, D, and ω are as defined above with respect to formula I, and where D and d are characterized by a vinyl content of at least 50%.

In one or more embodiments, d of formula II is characterized by a vinyl content (i.e. the percentage of mer units positioned in the 1,2-microstructure) of at least 50% in other embodiments at least 55%, in other embodiments at least 60%, in other embodiments at least 65%, in other embodiments at least 70%, in other embodiments at least 75%, in other embodiments at least 80%, and in other embodiments at least 85%. In these or other embodiments, D is characterized by a vinyl content of less than 100%, in other embodiments less than 95%, in other embodiments less than 90%, in other embodiments less than 85%, and in other embodiments less than 80%.

In one or more embodiments, d of formula II includes at least 10, in other embodiments at least 40, in other embodiments at least 60, and in other embodiments at least 80, in other embodiments at least 100, and in other embodiments at least 120 mer units deriving from the polymerization of conjugated diene monomer. In these or other embodiments, d of formula II includes less than 500, in other embodiments less than 350, in other embodiments less than 250, in other embodiments less than 200, in other embodiments less than 180, in other embodiments less than 160, and in other embodiments less than 120 mer units deriving from the polymerization of conjugated diene monomer.

In one or more embodiments, the blocks of the block copolymers defined by the formula II include less than 5%, in other embodiments less than 3%, in other embodiments less than 1%, and in other embodiments less than 0.5% tapering in any given block of the block copolymer. In these or other embodiments, the blocks of the block copolymers defined by the formula II are substantially devoid of tapering, which includes that amount of tapering or less that will not have an appreciable impact on the block copolymer. In one or more embodiments, the blocks of the block copolymers defined by the formula II are devoid of tapering.

One or more embodiments of the present invention provide block copolymers that may be defined by the formula III $$\alpha\text{-}V^O\text{-}D\text{-}V'\text{-}\omega$$

where each V is independently a polyvinyl aromatic block, D is a polydiene block, α and ω are each independently a hydrogen atom, a functional group, or a polymeric segment or block, and where D is characterized by a vinyl content of at least 50%.

In one or more embodiments, D of formula III is characterized by a vinyl content (i.e. the percentage of mer units positioned in the 1,2-microstructure) of at least 50% in other embodiments at least 55%, in other embodiments at least 60%, in other embodiments at least 65%, in other embodiments at least 70%, in other embodiments at least 75%, in other embodiments at least 80%, and in other embodiments at least 85%. In these or other embodiments, D is characterized by a vinyl content of less than 100%, in other embodiments less than 95%, in other embodiments less than 90%, in other embodiments less than 85%, and in other embodiments less than 80%.

In one or more embodiments, the D of formula III includes at least 250, in other embodiments at least 350, in other embodiments at least 450, and in other embodiments at least 550 mer units deriving from the polymerization of conjugated diene monomer. In these or other embodiments, the D block of formula III includes less than 800, in other embodiments less than 750, in other embodiments less than 700, in other embodiments less than 650, and in other embodiments less than 600 mer units deriving from the polymerization of conjugated diene monomer.

In one or more embodiments, the $V^O$ and V' blocks of formula III each independently include at least 25, in other embodiments at least 60, in other embodiments at least 75, in other embodiments at least 80, in other embodiments at least 90, in other embodiments at least 100, and in other embodiments at least 115 mer units deriving from the polymerization of vinyl aromatic monomer. In these or other embodiments, $V^O$ and $V'$ each independently include less than 200, in other embodiments less than 175, in other embodiments less than 160, in other embodiments less than 150, and in other embodiments less than 140 mer units deriving from the polymerization of vinyl aromatic monomer.

In one or more embodiments, the ratio of $V^O$ mer units to $V'$ mer units is at least 0.2:1, in other embodiments at least 0.4:1, in other embodiments at least 0.6:1, in other embodiments 0.8:1, in other embodiments at least 0.9:1, and in other embodiments at least 0.95:1. In these or other embodiments, the ratio of $V^O$ mer units to $V'$ mer units is less than 4:1, in other embodiments less than 3:1, in other embodiments less than 2:1, in other embodiments less than 1.5:1, in other embodiments less than 1.1:1, and in other embodiments less than 1.05:1. In one or more embodiments, the ratio of $V^O$ mer units to $V'$ mer units is about 1:1.

In one or more embodiments, the blocks of the block copolymers defined by the formula III include less than 5%, in other embodiments less than 3%, in other embodiments less than 1%, and in other embodiments less than 0.5% tapering in any given block of the block copolymer. In these or other embodiments, the blocks of the block copolymers defined by the formula III are substantially devoid of tapering, which includes that amount of tapering or less that will not have an appreciable impact on the block copolymer. In one or more embodiments, the blocks of the block copolymers defined by the formula III are devoid of tapering.

In one or more embodiments, α of formula III is a diene block, and therefore the block copolymer can be defined by the formula IV

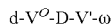

where d is a polydiene block, $V^O$, $V'$, D, and ω are as defined above with respect to Formula III, and where D and d are characterized by a vinyl content of at least 50%.

In one or more embodiments, d of formula IV is characterized by a vinyl content (i.e. the percentage of mer units positioned in the 1,2-microstructure) of at least 50%, in other embodiments at least 55%, in other embodiments at least 60%, in other embodiments at least 65%, in other embodiments at least 70%, in other embodiments at least 75%, in other embodiments at least 80%, and in other embodiments at least 85%. In these or other embodiments, d of formula IV is characterized by a vinyl content of less than 100%, in other embodiments less than 95%, in other embodiments less than 90%, in other embodiments less than 85%, and in other embodiments less than 80%.

In one or more embodiments, d of formula IV includes at least 10, in other embodiments at least 40, in other embodiments at least 60, and in other embodiments at least 80, in other embodiments at least 100, and in other embodiments at least 120 mer units deriving from the polymerization of conjugated diene monomer. In these or other embodiments, d of formula IV includes less than 500, in other embodiments less than 350, in other embodiments less than 250, in other embodiments less than 200, in other embodiments less than 180, in other embodiments less than 160, and in other embodiments less than 120 mer units deriving from the polymerization of conjugated diene monomer.

In one or more embodiments, the overall vinyl content of the block copolymers of the present invention may be at least 50%, in other embodiments at least 55%, in other embodiments at least 60%, in other embodiments at least 65%, in other embodiments at least 70%, in other embodiments at least 75%, in other embodiments at least 80%, and in other embodiments at least 85%. In these or other embodiments, d of formula IV is characterized by a vinyl content of less than 100%, in other embodiments less than 95%, in other embodiments less than 90%, in other embodiments less than 85%, and in other embodiments less than 80%. As those skilled in the art will appreciate, the overall vinyl content of the block copolymers can be tailored by adjusting the vinyl content of particular diene blocks. For example, where the block copolymers are defined by the formulae II and IV, the vinyl content of the d block can be increased, without necessarily providing a corresponding increase to the D block, to affect an overall increase in the vinyl content of block copolymer.

In one or more embodiments, the blocks of the block copolymers defined by the formula IV include less than 5%, in other embodiments less than 3%, in other embodiments less than 1%, and in other embodiments less than 0.5% tapering in any given block of the block copolymer. In these or other embodiments, the blocks of the block copolymers defined by the formula IV are substantially devoid of tapering, which includes that amount of tapering or less that will not have an appreciable impact on the block copolymer. In one or more embodiments, the blocks of the block copolymers defined by the formula IV are devoid of tapering.

In one or more embodiments, the peak molecular weight (Mp) of the overall block copolymers employed in the present invention may be at least 40 kg/mole, in other embodiments at least 50 kg/mole, in other embodiments at least 60 kg/mole, and in other embodiments at least 70 kg/mole. In these or other embodiments, the overall peak molecular weight of the block copolymers of the present invention may be less than 150 kg/mole, in other embodiments less than 125 kg/mole, in other embodiments less than 100 kg/mole, and in other embodiments less than 90 kg/mole.

In one or more embodiments, the block copolymers employed in the present invention can be synthesized by employing anionic polymerization techniques. In one or more embodiments, living polymers include anionically polymerized polymers (i.e., polymers prepared by anionic polymerization techniques). Anionically-polymerized living polymers may be formed by reacting anionic initiators with certain unsaturated monomers to propagate a polymeric structure. Throughout formation and propagation of the polymer, the polymeric structure may be anionic or "living." A new batch of monomer subsequently added to the reaction can add to the living ends of the existing chains and increase the degree of polymerization. A living polymer, therefore, includes a polymeric segment having a living or reactive end. Anionic polymerization is further described in George Odian, *Principles of Polymerization*, ch. 5 (3$^{rd}$ Ed. 1991), or Panek, 94 J. Am. Chem. Soc., 8768 (1972), which are incorporated herein by reference.

In one or more embodiments, the block copolymers of the present invention can be prepared by sequential addition of the distinct monomer that give rise to the various blocks. For example, vinyl aromatic monomer can be charged and polymerized to form a living polyvinyl aromatic living polymer chain. After the vinyl aromatic monomer is consumed or substantially consumed, the conjugated diene monomer can be charged. The conjugated diene monomer adds to the living polyvinyl aromatic chain and forms a polydiene block tethered thereto. After the diene monomer is consumed or substantially consumed, additional monomer can be added to form another block tethered to the copolymer. For example, vinyl aromatic monomer can be charged to form another vinyl aromatic block. This process can be continued until the living polymer is quenched (e.g. protonated).

The process can be started by employing an anionic polymerization initiator, although as those skilled in the art appreciate, other means can be employed to initiate the polymerization. Exemplary anionic initiators include organolithium compounds. In one or more embodiments, organolithium compounds may include heteroatoms. In these or other embodiments, organolithium compounds may include one or more heterocyclic groups.

Types of organolithium compounds that may be used as initiators include, but are not limited to, alkyllithium, aryllithium compounds, and cycloalkyllithium compounds. Specific examples of organolithium compounds include ethyllithium, n-propyllithium, isopropyllithium, n-butyllithium, sec-butyllithium, t-butyllithium, n-amyllithium, isoamyllithium, and phenyllithium. Still other anionic initiators include organosodium compounds such as phenylsodium and 2,4,6-trimethylphenylsodium. Also contemplated are those anionic initiators that give rise to di-living polymers, wherein both ends of a polymer chain is living. Examples of such initiators include dilithio initiators such as those prepared by reacting 1,3-diisopropenylbenzene with sec-butyllithium. These and related difunctional initiators are disclosed in U.S. Pat. No. 3,652,516, which is incorporated herein by reference.

In particular embodiments, the organolithium compounds include a cyclic amine-containing compound such as lithiohexamethyleneimine. These and related useful initiators are disclosed in the U.S. Pat. Nos. 5,332,810, 5,329,005, 5,578,542, 5,393,721, 5,698,646, 5,491,230, 5,521,309, 5,496,940, 5,574,109, and 5,786,441, which are incorporated herein by reference. In other embodiments, the organolithium compounds include alkylthioacetals (e.g., dithianes) such as 2-lithio-2-methyl-1,3-dithiane. These and related useful initiators are disclosed in U.S. Pat. No. 7,153,919, and U.S. Publ. Nos. 2006/0264590, and 2006/0264589, which are incorporated herein by reference. In still other embodiments, the organolithium compounds include alkoxysilyl-containing initiators, such as lithiated t-butyldimethylpropoxysilane. These and related useful initiators are disclosed in U.S. Pat. No. 7,335,712, which is incorporated herein by reference. In one or more embodiments, the anionic initiator employed is trialkyltinlithium compound such as tri-n-butyltinlithium. These and related useful initiators are disclosed in U.S. Pat. Nos. 3,426,006 and 5,268,439, which are incorporated herein by reference.

The amount of initiator employed in conducting anionic polymerizations can vary widely based upon the desired polymer characteristics. In one or more embodiments, from about 0.1 to about 100, and in other embodiments from about 0.33 to about 10 mmol of lithium per 100 g of monomer is employed.

In one or more embodiments, synthesis of the block copolymers of the present invention is conduction in solution, which includes those polymerization mediums where the monomer to be polymerized is dissolved in a solvent. In these or other embodiments, the polymer that is synthesized is also soluble in the solvent. In one or more embodiments, the anionic polymerizations of the present invention may be conducted in a polar solvent such as tetrahydrofuran (THF) or dialkyl ethers such as dimethyl ether, or a non-polar hydrocarbon such as the various cyclic and acyclic hexanes, heptanes, octanes, pentanes, their alkylated derivatives, and mixtures thereof, as well as benzene. Mixtures of two or more of these solvents can also be used. As those skilled in the art appreciate, the solvent can be selected to optimize the solubility of the monomer that is polymerized or the polymer that is synthesized.

In order to achieve the desired vinyl content of the polydiene blocks, polymerization of the diene monomer can be conducted in the presence of a vinyl modifier while maintaining the polymerization medium below certain threshold temperatures.

In one or more embodiments, compounds useful as vinyl modifiers include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as vinyl modifiers include tetrahydrofuran (THF), linear and cyclic oligomeric oxolanyl alkanes such as 2,2-bis(2'-tetrahydrofuryl) propane, di-piperidylethane, dipiperidylmethane, hexamethylphosphoramide, N—N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, which is incorporated herein by reference. Blends of two or more of the above vinyl modifiers may advantageously be employed to achieve the properties sought by the present invention. In particular embodiments, it has advantageously been discovered that bis-oxolanyl propane and oligomers thereof, including those disclosed in U.S. Pat. Nos. 4,429,091, 4,647,635, 5,241,008, and 5,331,035, which are incorporated herein by reference, are extremely beneficial for practicing the present invention and advantageously allow for production of the desired high-vinyl block copolymers under commercially feasible rates and conditions.

The amount of vinyl modifier (e.g. bis-oxolanyl propane) employed in conducting anionic polymerizations can vary widely based upon the desired vinyl content. In one or more embodiments, the amount of vinyl modifier employed may be expressed in parts by weight modifier per 100 parts by weight monomer. In one or more embodiments, at least 0.025 parts by weight, in other embodiments at least 0.1 parts by weight, in other embodiments at least 0.2 parts by weight, in other embodiments at least 0.35 parts by weight, and in other embodiments at least 0.5 parts by weight vinyl modifier per 100 parts by weight monomer may be employed. In these or other embodiments, less than 10 parts by weight, in other embodiments less than 5 parts by weight, in other embodiments less than 2.5 parts by weight, in other embodiments less than 1.0 parts by weight, and in other embodiments less than 0.8 parts by weight vinyl modifier per 100 parts by weight monomer may be employed.

In other embodiments, the amount of vinyl modifier employed may be expressed based upon the number of moles of vinyl modifier per moles of lithium (or other metal) associated with the initiator. In one or more embodiments, at least 0.1 moles, in other embodiments at least 0.5 moles, in other embodiments at least 1.0 moles, in other embodiments at least 1.25 moles, and in other embodiments at least 1.5 moles of vinyl modifier per mole of lithium may be employed. In these or other embodiments, less than 20 moles, in other embodiments less than 10 moles, in other embodiments less than 5 moles, in other embodiments less than 2.5 moles, and in other embodiments less than 2.0 moles of vinyl modifier per mole of lithium may be employed.

In one or more embodiments, the polymerization of the polydiene blocks (i.e. D and d) is conducted by setting the initial batch temperature (i.e. the temperature of the polymerization medium at the beginning of the polymerization of diene monomer) at temperatures below 30° C., in other embodiments below 25° C., in other embodiments below 20° C., in other embodiments below 15° C., and in other embodiments below 12° C. In these or other embodiments, the initial batch temperature may be set at above −10° C., in other embodiments above 0° C., and in other embodiments above 5° C.

In one or more embodiments, the temperature of the polymerization medium during the polymerization of conjugated diene monomer (i.e. during the formation of the polydiene blocks D or d) is maintained so as to achieve a peak polymerization temperature below 60° C., in other embodiments below 55° C., in other embodiments below 50° C., in other embodiments below 48° C., in other embodiments below 46° C., in other embodiments below 40° C., in other embodiments below 35° C., and in other embodiments below 30° C. As those skilled in the art appreciate, the initial batch temperature, as well as the peak polymerization temperature, can be controlled by employing several techniques, as well as combinations thereof. For example, the jacket temperature can be adjusted, reflux condensers can be employed, particular solvents can be selected, and the solids concentration of the polymerization can be adjusted. It has unexpectedly been discovered that the use of bis-oxolanyl propane and oligomers thereof as vinyl modifiers in the production of the block copolymers of the present invention advantageously allows for peak polymerization temperatures that are relatively high and yet achieve the benefits of relatively high vinyl polydiene blocks. As those skilled in the art will appreciate, this is extremely advantageous because it allows for the production of the block copolymers of the present invention at relatively high rates of polymerization yielding relatively high volume of polymer, which makes production of the block copolymers of the present invention commercially viable. For example, in one or more embodiments of the present invention, polymerization of the D block or blocks of the block copolymers of one or more embodiments of the present invention (e.g. the polydiene blocks) can be allowed to achieve a peak polymerization temperature of at least 18° C., in other embodiments least 20° C., in other embodiments at least 23° C., in other embodiments at least 25° C., in other embodiments at least 27° C., and in other embodiments at least 30° C. In these or other embodiments, particularly where block copolymers of the present invention include a diene block d (such as in formula II or IV), it has unexpectedly been discovered that advantages can be achieved by maintaining lower peak polymerization temperatures than maintained during polymerization of the D blocks. For example, in one or more embodiments, the peak polymerization temperature achieved during polymerization of the d block is at least at least 5° C., in other embodiments least 8° C., in other embodiments at least 10° C., in other embodiments at least 12° C., in other embodiments at least 15° C., and in other embodiments at least 18° C. In these or other embodiments, the peak polymerization temperature achieved during polymerization of the d block is less than 35° C., in other embodiments less than 30° C., in other embodiments less than 27° C., in other embodiments less than 25° C., and in other embodiments less than 22° C.

In one or more embodiments, it has been unexpectedly discovered that by maintaining the solids concentration of the polymerization medium during formation of the polydiene blocks defined by D (in the formulae above) at particular concentrations, benefits are realized in terms of an advantageous product produced at commercially viable rates and volumes. For example, in one or more embodiments, the solids content of the polymerization medium during formation of the D blocks is maintained at levels of at least 6%, in other embodiments at least 7%, in other embodiments at least 8%, in other embodiments at least 9%, in other embodiments at least 10%, in other embodiments at least 11%, and in other embodiments at least 12%. In these or other embodiments, the solids content of the polymerization medium during formation of the D block is maintained at levels below 22%, in other embodiments below 20%, in other embodiments below 18%, in other embodiments below 15%, and in other embodiments below 13%. Similarly, it has been unexpectedly discovered that by maintaining the solids concentration of the polymerization medium during formation of the polydiene blocks defined by d (in the formulae above) at particular concentrations, benefits are realized in terms of an advantageous product produced at commercially viable rates and volumes. For example, in one or more embodiments, the solids content of the polymerization medium during formation of the d blocks is maintained at levels of at least 0.5%, in other embodiments at least 1%, in other embodiments at least 2%, in other embodiments at least 3%, in other embodiments at least 4%, in other embodiments at least 5%, and in other embodiments at least 6%. In these or other embodiments, the solids content of the polymerization medium during formation of the d block is maintained at levels below 8%, in other embodiments below 7%, in other embodiments below 6%, in other embodiments below 5%, and in other embodiments below 4%.

The polymerization can be carried out as a batch process, a continuous process, or a semi-continuous process. In one or more embodiments, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In these or other embodiments, the polymerization mixture may be maintained under anaerobic conditions.

As those skilled in the art will appreciate, the solids content of the polymerization medium and the peak polymerization temperatures achieved during formation of the vinyl aromatic blocks V can be adjusted to achieve maximum efficiency without impact the vinyl content of the polydiene blocks.

In one or more embodiments, practice of the present invention advantageously allows for production of block copolymers at technologically useful rates of production. For example, in one or more embodiments, when operating at the solids contents provided for herein for the polydiene blocks, conversion of at least 90% of the monomer to be polymerized is achieved within at least 8 hours, in other embodiments at least 6 hours, in other embodiments at least 5, in other embodiments at least 4 hours, and in other embodiments at least 3 hours. In one or more embodiments, an overall conversion of monomer is achieved at technologically useful levels; for example, conversions of at least 90%, in other embodiments at least 92%, in other embodiments at least 95%, in other embodiments at least 97%, and in other embodiments at least 99% of the monomer charged is achieved when operating at the conditions provided for herein.

In one or more embodiments, a quenching agent can be added to the polymerization mixture in order to inactivate residual living polymer chains. The quenching agent may include a protic compound, which includes, but is not limited to, an alcohol, a carboxylic acid, an inorganic acid, water, or a mixture thereof. An antioxidant may be added along with, before, or after the addition of the quenching agent. The amount of the antioxidant employed may be in the range of, for example, 0.2% to 1% by weight of the polymer product. In one or more embodiments, a functionalizing or coupling agent may be used in lieu of or together with a quenching agent. As those skilled in the art appreciate, functionalizing agents provide a functional group at the end of the polymer chain, while coupling agents join two or more polymer chains together.

When the polymerization mixture has been quenched, the polymer product can be recovered from the polymerization mixture by using any conventional procedures of desolventization and drying that are known in the art. For instance, the polymer can be recovered by subjecting the polymer cement to steam desolventization, followed by drying the resulting polymer crumbs in a hot air tunnel. Alternatively, the polymer may be recovered by directly drying the polymer cement. The content of the volatile substances in the dried polymer can be below 1%, and in other embodiments below 0.5% by weight of the polymer.

For purposes of handling and transportation, the polymers of the present invention can be oil extended and optionally formed into bales of polymer. Any processing or extender oil employed in the rubber or thermoplastics industry can be employed in practicing the present invention. In particular embodiments, mineral oils are employed. In other embodiments, synthetic oils, such as polybutene or polyisobutylene oil can be employed.

The present invention will be described in more detail with reference to the following examples. While certain of the examples illustrate the use of polymers with at least one polyvinyl aromatic segment and at least one polydiene segment, where the polydiene segment is characterized by a relatively high vinyl content, to prepare diblock or triblock copolymers for example, it is specifically contemplated that such polymers can be used to prepare other copolymers comprising two or more homopolymers as well.

In order to demonstrate the practice of the present invention, the following examples have been prepared and tested. The examples should not, however, be viewed as limiting the scope of the invention. The claims will serve to define the invention.

EXAMPLES

Example 1: High Vinyl Butadiene/Styrene Diblock Copolymer

A 100 gallon reactor vessel, under a nitrogen atmosphere, was cooled with a surrounding jacket flowing with chilled water to target a temperature between 10° C. and 20° C. The vessel was charged first with hexane and then with a 1,3-butadiene (1,3-Bd)/hexane blend (22% 1,3-Bd in solution) further referred to as Blend B. With the batch temperature equilibrated at a target temperature between 10° C. and 20° C., the batch was then catalyzed by charging n-butyl lithium (nBuLi) 3% solution in hexane and immediately thereafter charging with neat oligomeric oxolanyl propanes (OOPs). The vessel was then allowed to warm up for a time between 10 and 20 minutes until peak polymerization temperature was reached and then polymerized further for a time between 10 and 15 minutes to convert all 1,3-Bd to polymer.

The next block was initiated by charging the reactor vessel with a styrene/hexane blend (32% styrene in solution) further referred to as Blend S. The surrounding jacket was used to heat the reactor vessel to a temperature up to 60° C. to fully convert all monomer. The conversion of monomer required a polymerization time of only between 5 and 10 minutes. The reaction was terminated with neat 2-ethyl hexanoic acid (EHA). The resulting polymer cement was dried to a crumb form.

To further illustrate the preparation of the polymer, the quantities used to charge the vessel in preparation of representative Sample 10 of Table 1 are detailed as follows:

| | |
|---|---|
| Hexane | 118.3 kg |
| Blend B | 33.1 kg |
| nBuLi (3%) | 0.67 kg |
| OOPs | 0.084 kg |
| Blend S | 19.3 kg |
| EHA | 0.044 kg |

Other samples were prepared similarly, charging the vessel with specific amounts to generate the solids contents achieved for Samples 1 through 16 in Table 1.

The resulting polymer represented by Samples 1 through 16 of Table 1 had an average vinyl content of 80.3%. The average vinyl content for samples in which the peak polymerization temperature of the Bd block did not exceed 46° C., i.e. Samples 1, 9-11, and 16, was 82.5%. Polymer molecular weight values were obtained from a calibrated Gel Permeation Chromatography (GPC) instrument and bound styrene content and total vinyl contents were obtained by Nuclear Magnetic Resonance (NMR) unless otherwise noted.

TABLE 1

| 2Sample No. | OOPs eq per Li | % Total Solids | % solids Bd | Peak Temp ° C. (Bd block) | $M_p$ (kg/mol) | % Bound Styrene | % vinyl Bd |
|---|---|---|---|---|---|---|---|
| 1 | 1 | 14 | 9.5 | 39.4 | 62 | 44.9 | 82.5 |
| 2 | 1.5 | 14 | 9.5 | 52.8 | 61 | 46.2 | 80.7 |
| 3 | 1.5 | 14 | 9.5 | 52.8 | 45 | 44.2 | 79.8 |
| 4 | 1.5 | 14 | 9.5 | 55.6 | 36 | 44.3 | 78.2 |
| 5 | 1.5 | 12 | 7.8 | 63.3 | 59 | 45.0 | 75.3 |
| 6 | 1.5 | 12 | 7.8 | 50.0 | 44 | 44.8 | 79.9 |
| 7 | 1.5 | 10 | 6.4 | 47.2 | 36 | 43.8 | 79.7 |
| 8 | 1.5 | 10 | 6.4 | 50.6 | 65 | 44.6 | 81.3 |
| 9 | 1.5 | 10 | 6.4 | 38.3 | 44 | 44.7 | 81.6 |
| 10 | 1.5 | 8 | 4.9 | 41.1 | 45 | 47.2 | 82.1 |
| 11 | 1.5 | 8 | 4.9 | 40.6 | 46 | 46.9 | 82.8 |
| 12 | 1.5 | 14 | 9.4 | 50.0 | 75 | 45.3 | 78.2 |
| 13 | 1.5 | 14 | 9.4 | 55.0 | 90 | 45.0 | 78.4 |
| 14 | 1.5 | 14 | 9.4 | 51.1 | 116 | 46.8 | 81.6 |
| 15 | 1.5 | 14 | 9.4 | 50.0 | 129 | 45.6 | 78.9 |
| 16 | 1.5 | 8 | 6.7 | 35.0 | 99 | 25.1 | 83.4 |

Peak polymerization temperatures of the Bd block between 46 and 55° C. may or may not yield desired high vinyl content above 80% due to dependence upon multiple thermodynamic and kinetic factors. Peak polymerization temperatures above 55° C. are not desired.

Example 2: High Vinyl butadiene/Styrene/Butadiene

A 100 gallon reactor vessel, under a nitrogen atmosphere, was cooled to a target temperature between 10° C. and 20° C. The vessel was charged with hexane and then with Blend B. After equilibrating to batch temperature between 10° C.

and 20° C., the polymerization was catalyzed by charging nBuLi (3% solution) and immediately thereafter charging with neat OOPS. The polymerization solution slowly exothermed over 10 to 20 minutes until peak polymerization temperature was reached and then allowed to react further for a time between 10 and 15 minutes to convert all 1,3-Bd to polymer. The next block was initiated by charging the reactor vessel with Blend S. The surrounding jacket was not heated during polymerization of this block.

The temperature was allowed to drop to below 30° C. before continuing with the next block. The vessel was then charged with Blend B to form the second high vinyl butadiene block and peak polymerization temperatures recorded. The reaction was terminated with neat EHA as above in Example 1. The resulting polymer cement was dried to a crumb form.

To further illustrate the preparation of the polymer, the quantities used to charge the vessel in preparation of representative Sample 18 of Table 2 are detailed as follows:

| | |
|---|---|
| Hexane | 97.1 kg |
| 1$^{st}$ Blend B | 9.8 kg |
| nBuLi (3%) | 0.77 kg |
| OOPs | 0.1 kg |
| Blend S | 30.8 kg |
| 2nd Blend B | 43.2 kg |
| EHA | 0.05 kg |

Other samples were prepared similarly, charging the vessel with specific amounts to generate the solids contents achieved for Samples 17 through 20 of Table 2.

The resulting polymer represented by Samples 17 through 20 of Table 2 had an average vinyl content of 82.0%. Polymer molecular weight values were obtained by GPC and bound styrene content and total vinyl contents were obtained by NMR unless otherwise noted.

TABLE 2

| Sample No. | OOPs eq per Li | % Total Solids | % solids Bd1/Bd2 | Peak Temp ° C. (Bd2 block) | $M_p$ (kg/mol) | % Bound Styrene | % vinyl Bd |
|---|---|---|---|---|---|---|---|
| 17 | 1.5 | 12 | 2.0/5.2 | 27.8 | 42 | 45.8 | 81.4 |
| 18 | 1.5 | 12 | 2.0/5.3 | 39.4 | 62 | 45.9 | 80.5 |
| 19 | 1.5 | 12 | 2.0/5.2 | 26.1 | 76 | 48.3 | 83.9 |
| 20 | 1.5 | 12 | 2.0/5.3 | 29.4 | 99 | 46.5 | 82.0 |

Example 3: High Vinyl butadiene/Styrene/Butadiene/Styrene

A 100 gallon reactor vessel, under a nitrogen atmosphere, was cooled to a target temperature between 10° C. and 20° C. The vessel was charged with hexane and then with Blend B. With the batch temperature equilibrated at a target temperature between 10° C. and 20° C., the batch was then catalyzed by charging nBuLi (3% solution) and immediately thereafter charging with neat OOPS. The vessel was then allowed to warm up for a time between 10 and 20 minutes until peak polymerization temperature was reached and then polymerized further for a time between 10 and 15 minutes to convert all 1,3-Bd to polymer. The next block was initiated by charging the reactor vessel with Blend S. The surrounding jacket was not heated during polymerization of this block.

The temperature was allowed to drop to below 30° C. before continuing with the next block. The vessel was then charged with Blend B to form the second high vinyl butadiene block and peak polymerization temperatures recorded. The reactor vessel was further charged with Blend S. The surrounding jacket was used to heat the reactor vessel to a temperature up to 60° C. to fully convert all monomer. The conversion of monomer required a polymerization time of only between 5 and 10 minutes. The reaction was terminated with neat EHA. The resulting polymer cement was dried to a crumb form.

To further illustrate the preparation of the polymer, the quantities used to charge the vessel in preparation of representative Sample 26 of Table 3 are detailed as follows:

| | |
|---|---|
| Hexane | 69.2 kg |
| 1$^{st}$ Blend B | 13.2 kg |
| nBuLi (3%) | 1.03 kg |
| OOPs | 0.134 kg |
| 1$^{st}$ Blend S | 20.6 kg |
| 2$^{nd}$ Blend B | 57.8 kg |
| 2$^{nd}$ Blend S | 20.6 kg |
| EHA | 0.07 kg |

Other samples were prepared similarly, charging the vessel with specific amounts to generate the solids contents achieved for Samples 21 through 33 of Table 3.

The resulting polymer represented by Samples 21 through 33 of Table 3 had an average vinyl content of 83.2%. The average vinyl content for samples in which the peak polymerization temperature of the Bd block did not exceed 46° C., i.e. Samples 21, 23, and 25-33, was 83.9%. Polymer molecular weight values were obtained by GPC and bound styrene content and total vinyl contents were obtained by NMR unless otherwise noted.

TABLE 3

| Sample No. | OOPs eq per Li | % Total Solids | % solids Bd1/Bd2 | Peak Temp ° C. (Bd2 block) | $M_p$ (kg/mol) | % Bound Styrene | % vinyl Bd |
|---|---|---|---|---|---|---|---|
| 21 | 1.5 | 14 | 2.7/6.8 | 44.4 | 60 | 46.0 | 84.0 |
| 22 | 1.5 | 18 | 4.7/9.0 | 50.0 | 60 | 43.6 | 80.0 |
| 23 | 1.5 | 12 | 2.0/5.7 | 32.8 | 61 | 44.7 | 84.0 |
| 24 | 1.5 | 20 | 6.3/10.2 | 55.0 | 61 | 45.1 | 79.3 |
| 25 | 2 | 16.5 | 3.1/8.8 | 25.6 | 64 | 44.1 | 84.2 |
| 26 | 1.5 | 16 | 3.4/7.6 | 42.2 | 64 | 43.7 | 81.4 |
| 27 | 1 | 16.5 | 3.1/8.8 | 27.2 | 65 | 44.0 | 84.3 |
| 28 | 1.5 | 16.5 | 3.9/8.4 | 41.1 | 65 | 43.1 | 84.0 |
| 29 | 0.75 | 16.5 | 3.1/8.9 | 25.6 | 66 | 44.8 | 85.4 |
| 30 | 1.75 | 18 | 4.7/9.0 | 37.2 | 67 | 45.0 | 83.8 |
| 31 | 1 | 16.5 | 3.1/8.8 | 25.0 | 70 | 43.7 | 85.2 |
| 32 | 1.5 | 14 | 2.7/6.8 | 30.6 | 95 | 45.8 | 82.3 |
| 33 | 1.5 | 14 | 2.7/6.8 | 23.9 | 114 | 45.1 | 84.0 |

Comparative Showing

Samples 34-36 were prepared similarly as in Example 3 charging the vessel with specific amounts to obtain the solids contents as listed on Table 4. For each Sample 34 through 36, the peak polymerization temperature far exceeded 46° C., the temperature below which desired vinyl contents are confidently achieved. The peak polymerization temperature further exceeded 55° C., the temperature above which vinyl content greater than 80% is not achieved.

TABLE 4

| Sample No. | OOPs eq per Li | % Total Solids | % solids Bd1/Bd2 | Peak Temp ° C. (Bd2 block) | $M_p$ (kg/mol) | % Bound Styrene | % vinyl Bd |
|---|---|---|---|---|---|---|---|
| 34 | 1 | 18 | 4.3/10.4 | 61.7 | 71 | 40.0 | 76 |
| 35 | 2 | 18 | 4.3/10.4 | 63.3 | 73 | 40.0 | 78* |
| 36 | 2 | 18 | 4.3/10.4 | 62.8 | 71 | 40.0 | 78 |

*Estimated value based upon IR data.

Whereby solids content and peak polymerization temperature are well controlled, the polymer and process of the invention yields desired high vinyl content block copolymers.

Various modifications and alterations that do not depart from the scope and spirit of this invention will become apparent to those skilled in the art. This invention is not to be duly limited to the illustrative embodiments set forth herein.

The invention claimed is:

1. A method for the preparation of block copolymers including at least one high vinyl segment the method comprising steps of:
   (i) charging into a reactor 1,3-butadiene monomer in a hydrocarbon solvent, a catalytically effective amount of anionic initiator, and an oligomeric oxolanyl propane, where the concentration of the oligomeric oxolanyl propane is at least 0.1 and less than 20 moles per mole of initiator, whereby the reactor is optionally cooled;
   (ii) allowing the 1,3-butadiene monomer to polymerize at a peak polymerization temperature of at least about 18° C. and less than about 60° C. to form a first polybutadiene block characterized by a vinyl content of at least 70 percent by weight, the first polybutadiene block having less than 180 mer units;
   (iii) after step (ii), charging into the reactor a vinyl aromatic monomer, whereby the reactor is optionally heated to a temperature up to about 60° C.;
   (iv) allowing the vinyl aromatic monomer to polymerize to form a second block;
   (v) after step (iv), charging additional monomer into the reactor, wherein the additional monomer is conjugated diene monomer;
   (vi) allowing the additional conjugated diene monomer to polymerize to thereby form a third block; and
   (vii) charging into the reactor a quenching agent;
   where the method produces a block copolymer having an overall vinyl content that is greater than 70 percent by weight.

2. The method of claim 1, where the concentration of the oligomeric oxolanyl propane in step (i) is at least 0.1 and less than 5 moles per mole of initiator.

3. The method of claim 1, where step (ii) includes allowing the 1,3-butadiene monomer to polymerize at a peak polymerization temperature of at least about 18° C. and less than about 46° C.

4. The method of claim 1, further comprising, between step (iv) and step (v), a step of dropping to a temperature below 30° C.

5. The method of claim 1, where the peak polymerization temperature achieved during step (vi) is at least 18° C. and less than 55° C.

6. The method of claim 1, further comprising, between steps (vi) and (vii), steps of:
   a. further charging into the reactor additional vinyl aromatic monomer; and
   b. allowing the additional vinyl aromatic monomer to polymerize to thereby form a fourth block.

7. The method of claim 1, where step (iii) includes the reactor being heated to a temperature up to about 60° C.

8. The method of claim 1, where the first polybutadiene block is characterized by a vinyl content of at least 80 percent by weight.

9. The method of claim 1, where the first polybutadiene block is characterized by a vinyl content of at least 85 percent by weight.

10. The method of claim 1, where the method produces a block copolymer having an overall vinyl content that is greater than 80 percent by weight.

11. The method of claim 1, where the method produces a block copolymer having an overall vinyl content that is greater than 85 percent by weight.

12. The method of claim 1, where the third block is characterized by a vinyl content of at least 70 percent by weight.

13. A method for the preparation of block copolymers including at least one high vinyl segment the method comprising steps of:
   (i) charging into a reactor conjugated diene monomer in a hydrocarbon solvent, a catalytically effective amount of anionic initiator, and an oligomeric oxolanyl propane, where the concentration of the oligomeric oxolanyl propane is at least 0.1 and less than 20 moles per mole of initiator, whereby the reactor is optionally cooled;
   (ii) allowing the conjugated diene monomer to polymerize at a peak polymerization temperature of at least about 18° C. and less than about 60° C. to form a first block characterized by a vinyl content of at least 70 percent by weight, the first block having less than 180 mer units;
   (iii) after step (ii), charging into the reactor a vinyl aromatic monomer, whereby the reactor is optionally heated to a temperature up to about 60° C.;
   (iv) allowing the vinyl aromatic monomer to polymerize to form a second block;
   (v) after step (iv), charging additional conjugated diene monomer into the reactor;
   (vi) allowing the additional conjugated diene monomer to polymerize to thereby form a third block; and
   (vii) charging into the reactor a quenching agent;
   where the method produces a block copolymer having an overall vinyl content that is greater than 70 percent by weight.

14. A method for the preparation of block copolymers including at least one high vinyl segment the method comprising steps of:
   (i) charging into a reactor conjugated diene monomer in a hydrocarbon solvent, a catalytically effective amount of anionic initiator, and an oligomeric oxolanyl propane, whereby the reactor is optionally cooled;
   (ii) allowing the conjugated diene monomer to polymerize to form a first block, the first block having less than 180 mer units;
   (iii) after step (ii), charging into the reactor a vinyl aromatic monomer, whereby the reactor is optionally heated to a temperature up to about 60° C.;
   (iv) allowing the vinyl aromatic monomer to polymerize to form a second block;
   (v) after step (iv), charging additional conjugated diene monomer into the reactor;

(vi) allowing the additional conjugated diene monomer to polymerize to thereby form a third block;
(vii) after step (vi), further charging into the reactor additional vinyl aromatic monomer;
(viii) allowing the additional vinyl aromatic monomer to polymerize to thereby form a fourth block; and
(ix) charging into the reactor a quenching agent.

* * * * *